(12) United States Patent
Yeates et al.

(10) Patent No.: US 7,853,525 B2
(45) Date of Patent: Dec. 14, 2010

(54) ELECTRONIC DRAFT CAPTURE

(75) Inventors: Anthony James Yeates, Redmond, WA (US); Pavel Anatolievich Dournov, Redmond, WA (US); Balaji Balasubramanian, Redmond, WA (US); Vaidyanathan Arunachalam, Redmond, WA (US); Donna Lynn Whitlock, Seattle, WA (US); Timothy Belvin, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 1666 days.

(21) Appl. No.: 10/620,293

(22) Filed: Jul. 15, 2003

(65) Prior Publication Data

US 2005/0015336 A1   Jan. 20, 2005

(51) Int. Cl.
*G06Q 40/00* (2006.01)
(52) U.S. Cl. .............................. 705/40; 705/35; 705/44
(58) Field of Classification Search .................. 705/40, 705/35, 39, 79, 44, 36; 709/227; 715/744
See application file for complete search history.

(56) References Cited

U.S. PATENT DOCUMENTS

| | | | | |
|---|---|---|---|---|
| 3,956,615 A * | 5/1976 | Anderson et al. | ............. | 705/72 |
| 4,264,782 A * | 4/1981 | Konheim | ..................... | 705/75 |
| 5,371,797 A * | 12/1994 | Bocinsky, Jr. | ................. | 705/70 |
| 5,500,890 A * | 3/1996 | Rogge et al. | ............. | 379/91.02 |
| 5,526,409 A * | 6/1996 | Conrow et al. | ........... | 379/91.02 |
| 5,621,201 A * | 4/1997 | Langhans et al. | ........... | 235/380 |
| 5,651,002 A * | 7/1997 | Van Seters et al. | .......... | 370/392 |
| 5,812,668 A * | 9/1998 | Weber | ......................... | 705/79 |
| 5,850,446 A * | 12/1998 | Berger et al. | ................... | 705/79 |
| 5,903,878 A * | 5/1999 | Talati et al. | ..................... | 705/26 |
| 5,983,208 A * | 11/1999 | Haller et al. | ................... | 705/40 |
| 6,119,105 A * | 9/2000 | Williams | ...................... | 705/39 |
| 6,134,588 A * | 10/2000 | Guenthner et al. | .......... | 709/226 |
| 6,302,326 B1 * | 10/2001 | Symonds et al. | ............ | 235/379 |
| 6,334,114 B1 * | 12/2001 | Jacobs et al. | .................. | 705/26 |
| 6,337,861 B1 * | 1/2002 | Rosen | ......................... | 370/389 |
| 6,393,411 B1 * | 5/2002 | Bishop et al. | .................. | 705/44 |
| 6,480,894 B1 * | 11/2002 | Courts et al. | ................. | 709/227 |
| 6,966,034 B2 * | 11/2005 | Narin | .......................... | 715/744 |
| 6,970,849 B1 * | 11/2005 | DeMello et al. | ............... | 705/52 |
| 7,016,875 B1 * | 3/2006 | Steele et al. | ................... | 705/44 |

(Continued)

OTHER PUBLICATIONS

Microsoft Enhanced Coverage Linkings Visual Interdev streamlines the development of truly interactive Web content Nicolaisen, Nancy. Jun. 1, 1997: p. p599(3) vol. V17 No. N6 p. 1-8.*

(Continued)

*Primary Examiner*—Kambiz Abdi
*Assistant Examiner*—Jamie H Swartz
(74) *Attorney, Agent, or Firm*—Westman, Champlin & Kelly, P.A.

(57) ABSTRACT

A gateway server, point of sale device and protocol are provided for processing financial transactions. A public network interface is configured to couple to a public network and communicate financial authorization requests. The financial authorization requests can include, for example, transaction specific data, a merchant store or location invariant and a supplemental header. A gateway processor processes the financial transaction authorization requests and couples to a financial network interface configured to couple to at least one financial network. The gateway provides a response to the point of sale device based upon data received from the financial network and the authorization request.

43 Claims, 5 Drawing Sheets

U.S. PATENT DOCUMENTS

| | | | |
|---|---|---|---|
| 7,051,002 B2 * | 5/2006 | Keresman et al. | 705/44 |
| 7,069,244 B2 * | 6/2006 | Strayer et al. | 705/39 |
| 2002/0120846 A1 * | 8/2002 | Stewart et al. | 713/168 |
| 2003/0004828 A1 * | 1/2003 | Epstein | 705/26 |
| 2003/0229590 A1 * | 12/2003 | Byrne et al. | 705/40 |
| 2005/0192892 A1 * | 9/2005 | Willard | 705/39 |

OTHER PUBLICATIONS

TCP/IP Inustrated vol. 1. Richard Stevens. 1994. Addison Wesley Longman. vol. 1, p. 34-37.*

"A Perspective on Web Services", WebServices.Org, 12 pages, Feb. 18, 2002.

"The Past, Present and Future of Web Services, Part 1", WebServices. Org, 5 pages, Sep. 28, 2002.

"Programming with Web Services Enhancements 1.0 for Microsoft. NET", *Microsoft Corporation*, 8 pages, Dec. 2002.

"Inside the Web Services Enhancements Pipeline", *Microsoft Corporation*, 8 pages, Dec. 2002.

"Understanding GXA", *Microsoft Corporation*, 5 pages, Jul. 2002.

"Tell me about Web Services, and make is Quick", WebServices.Org, 2 pages, Jun. 3, 2002.

"Cassette for VisaNet Supplement", *IBM*, pp. 1-81, Dec. 2000.

"Understanding SOAP", *DevelopMentor*, 9 pages, Mar. 2003.

"Understanding XML Schema", *DevelopMentor*, 10 pages, Mar. 2003.

* cited by examiner

ELECTRONIC DRAFT CAPTURE

BACKGROUND OF THE INVENTION

The present invention relates to processing financial transaction authorization requests from merchants. More specifically, the present invention relates to a payment processing gateway for use in processing financial transaction authorization requests and a protocol accessing such a gateway.

In a retail transaction, a purchaser purchases a retail product from a merchant. Retail transactions have been used throughout much of human history. Having evolved from a simple barter system, there has been an ongoing trend to make such transactions more efficient and convenient for the consumer and the merchant. As an alternative to barter, money was used to represent the value of items to allow more flexibility in such transactions. Next, there was the realization that the money involved in the transaction did not need to be physically present at the transaction time. For example, a debit ledger can be maintained by the merchant and used to record sales in which credit was extended to the consumer. This allowed the consumer to pay for the goods at a future date. Checking systems are also employed in which a check is issued allowing the recipient to draw on those funds from a bank.

Charge, debit cards, electronic checks and the like ("financial cards") provide far more convenience to the consumer than the use of physical checks. Originally, copies of receipts from such financial card transactions were simply maintained by the merchant and periodically processed. Eventually real time authorization techniques were provided by financial card issuers. In such systems, a merchant is able to obtain an authorization from the financial card issuer prior to completion of the retail transaction. Various types of authorization can be used, for example an authorization can be obtained through oral communication, such as through a telephone call. Authorizations can also be obtained through digital communication techniques.

Presently, many retail locations employ point of sale (POS) devices in which a magnetic strip on a financial card is "swiped" through a card reader. Data on a "smartcard" chip can also be read. The data can be read using a magnetic sensor, electrical contacts, a radio frequency (RF) connection, or through other techniques. The card reader or a device connected to the reader, initiates a telephone call with an authorization center. The authorization center is able to immediately authorize or decline a particular transaction. The point of sale device informs personnel at the retail location of the result of the authorization request. If the transaction is questionable, the merchant can be required to obtain further information for verifying the card holding prior to providing authorization for the transaction. With the advent of the Internet, such authorization procedures are moving away from point to point telephone connections and are beginning to exploit the connectivity that the Internet provides. In such transactions, a device at the point of sale uses a secure communication technique, such as a Secure Socket Layer (SSL), to communicate with a authorization gateway. The gateway is capable of simultaneously communicating with point of sale devices from multiple merchants. The gateway contacts the appropriate financial institution regarding the authorization request and relays the result of the authorization request back to the appropriate point of sale device through the Internet connection. There is an ongoing need to improve the performance and convenience of such transactions.

SUMMARY OF THE INVENTION

A gateway server, point of sale (POS) device and protocol are provided for processing financial transactions. A public network interface is configured to couple to a public network and communicate financial authorization requests. Financial transaction authorization requests can include, for example, transaction specific data, merchant or store/location invariant data and a supplemental header. A gateway processor processes the financial transaction authorization requests and couples to a financial network interface configured to couple to at least one financial network. The gateway provides a response to the point of sale device based upon data received from the financial network and the financial authorization request. The response can also be based upon configuration or validation data maintained by the gateway.

DETAILED DESCRIPTION OF ILLUSTRATIVE EMBODIMENTS

The present invention provides a protocol and implementation to support various forms of electronic fund transaction types. Examples of electronic fund transactions are those which are based upon credit cards, charge cards, debit cards, check verification, gift cards, coupons, etc. As used herein, these various types of electronic fund transactions are referred to as "financial transactions" or "financial cards," although a physical card is not required. Various transaction types are supported including the types "authorize", "void", "return", "settle", etc.

Point of sale (POS) terminals communicate directly over a public network such as the Internet, or through a retail server system which couples to the public network, to a payment processing gateway server. The payment processing gateway server provides a link between authorization requests received from the public network and at least one financial network. The financial network provides communications with at least one financial institution which is capable of authorizing the particular transaction. The financial network can be a private network or can be a secure link over a public network.

Figure 1:
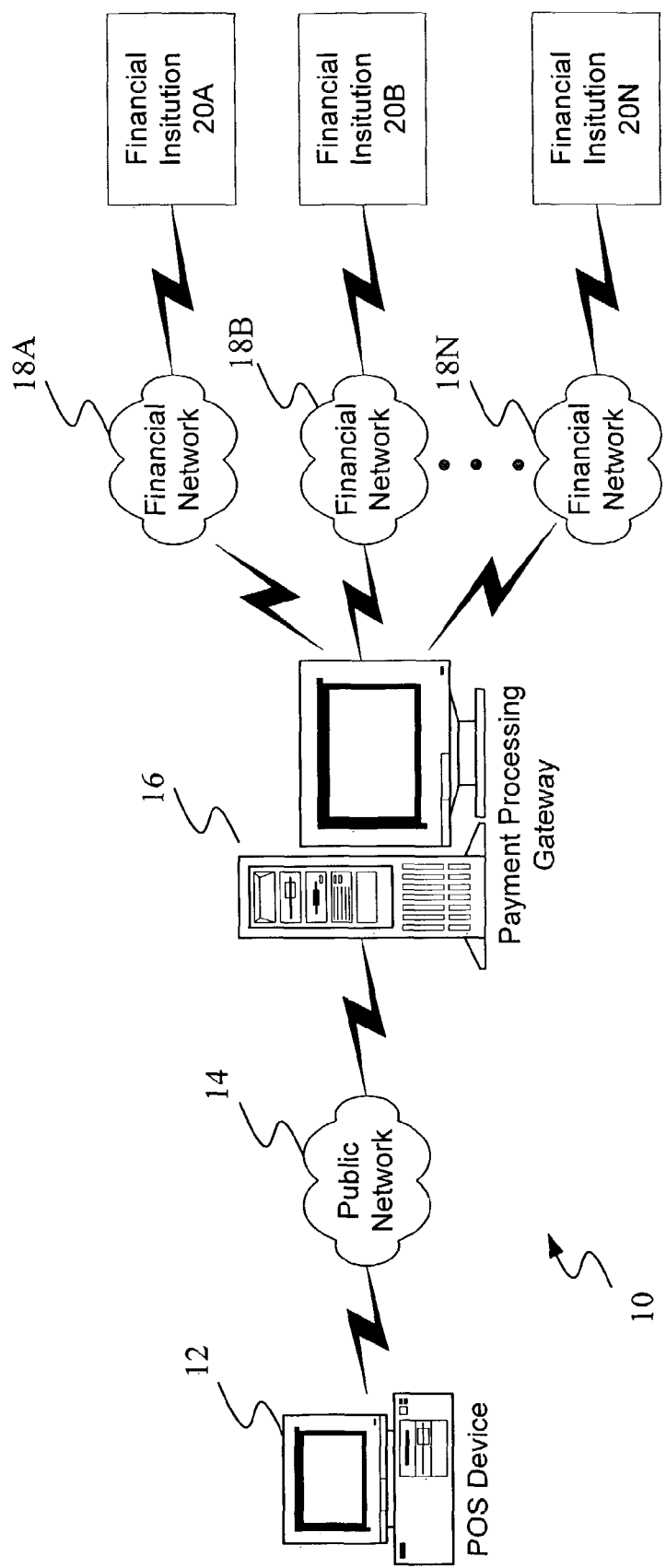
FIG. 1 is a simplified diagram showing a payment processing gateway coupling a point of sale device to financial institutions across public and financial networks.

FIG. 1 is a simplified block diagram of an electronic fund transaction processing system 10 in accordance with one example embodiment of the present invention. The transaction processing system 10 includes a point of sale (POS) device 12 which couples to a public network 14, such as the Internet. A payment processing gateway 16 couples to the public network 14 and is in communication with the point of sale device 12. The payment processing gateway 16 couples to at least one financial network 18A, 18B . . . 18N. The financial network 18A-N can be a private network or a secure communication link over a public network such as the Internet. At least one financial institution 20A, 20B . . . 20N couples to each of the respective financial networks 18A, 18B . . . 18N. Any number of financial institutions 20A-N can couple to a single financial network 18A-N.

The point of sale device 12 can be physically located at a retail location such as a retail store. The device 12 can comprise an individual cash register, for example, or can be a retail server system which is used to connect to multiple point of sale devices. Such a retail server system can provide additional functionality such as inventory control, theft prevention, etc. The retail server system can be implemented in a separate server or in a peer-to-peer architecture. The retail location can include a local area network which couples to the point of sale device 12. In some systems, wireless networks are provided. In one aspect, the present invention reduces communication overhead on such networks.

Figure 2:
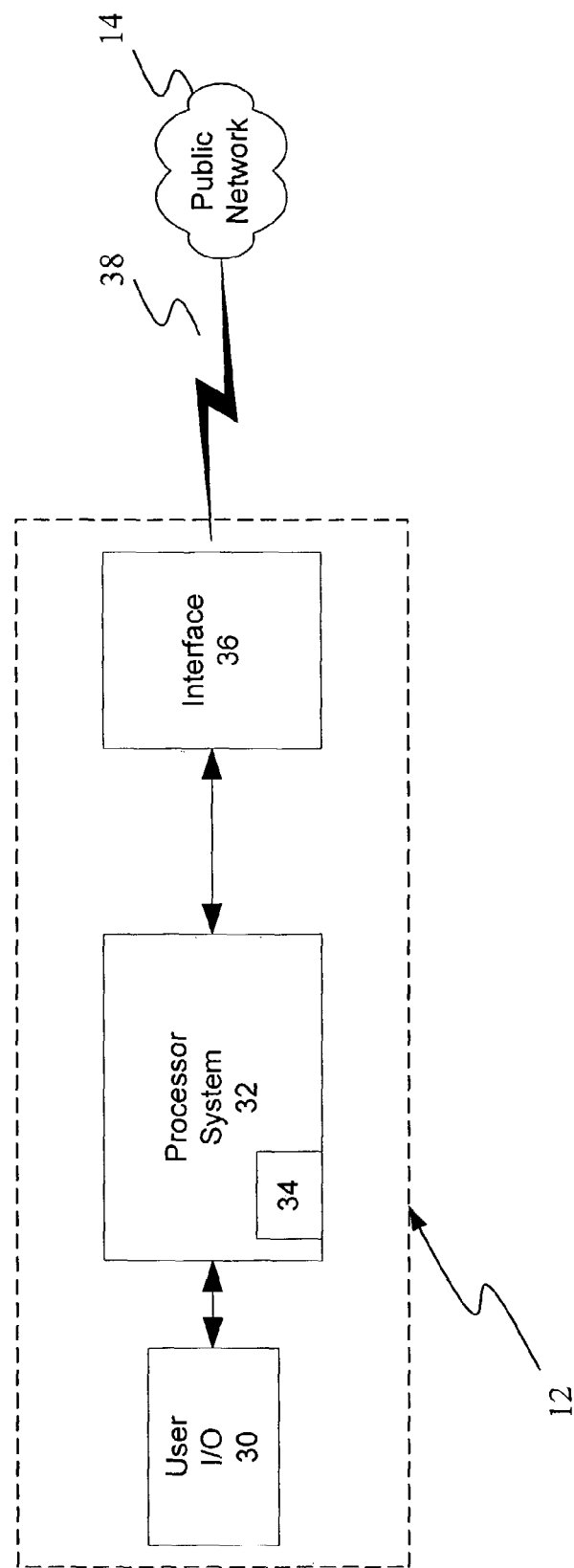
FIG. 2 is a block diagram showing the point of sale device of FIG. 1 in greater detail.

FIG. 2 is a simplified block diagram of point of the sale device 12 shown in FIG. 1 and which includes a user input/output 30. The user input/output 30 can comprise, for example, a display, keyboard, a touch screen, pointing device, card reader such as a magnetic card reader, RFID reader, magnetic stripe reader, smartcard reader, voice recognition device or the like, weighing scale, or any of the various inputs and outputs discussed below or known in the art. The input/output 30 couples to a processor system 32 which includes a memory 34. Memory 34 is used for storing programming instructions as well as data. A network interface 36 is used to couple the processor system 32 to the public network 14 over a physical layer 38. User input/output 30 is used to initiate a financial card authorization request by processor 32. Processor 32 formats the request in accordance with the appropriate protocol format for transmission by network interface 36 over the physical layer 38. The physical layer 38 can be any type of network connection. In addition, processor system 32 can perform other functions such as maintain inventory, perform cash register operations, provide instructions to an operator, provide information or advertisements to a consumer, etc.

Figure 3:
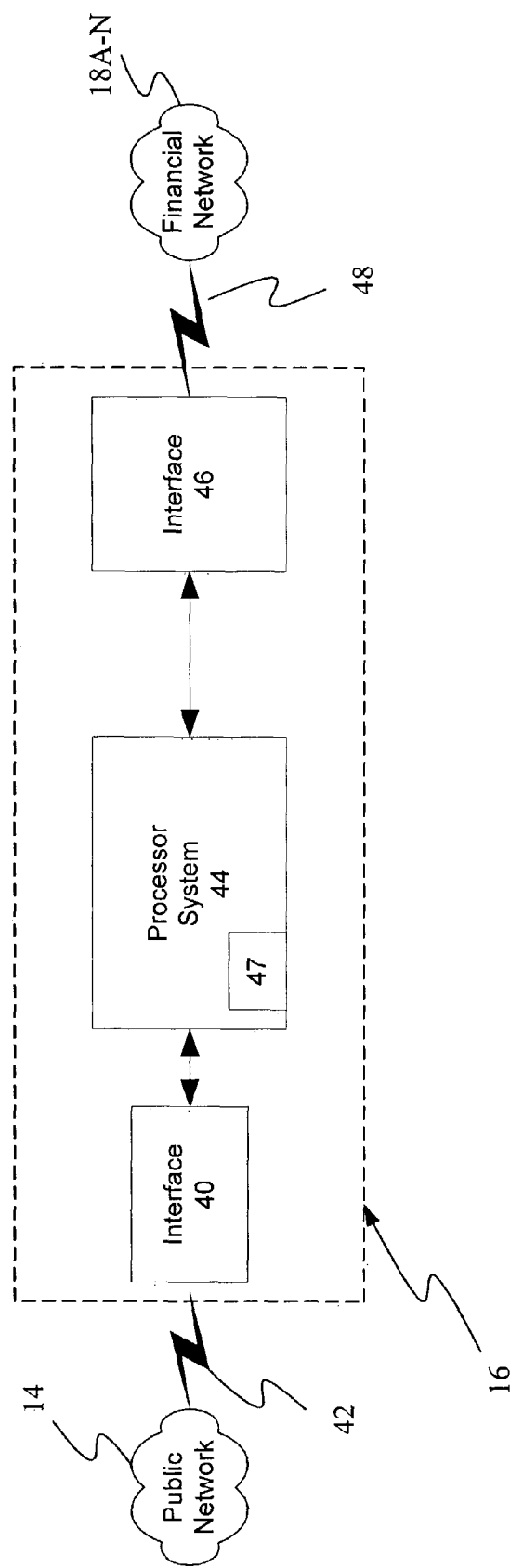
FIG. 3 is a block diagram showing the payment processing gateway of FIG. 1 in greater detail.

FIG. 3 is a simplified block diagram of payment processing gateway 16. Gateway 16 includes a network interface 40 configured to couple to the public network 14 through physical layer 42. A processor system 44 includes a memory 47 which contains programming instructions and data. Processor system 44 couples to public network 14 through interface 40 and to financial networks 18A-N through a network interface 46. Network interface 46 couples to financial network 18A-N through physical layer 48.

In operation, gateway 16 receives authorization requests from point of sale device 12 over public network 14. The authorization requests are formatted in accordance with the appropriate transmission protocol for transmission over financial network 18A-N to a respective financial institution 20A-N. When gateway 16 receives a response to an authorization request from the appropriate financial institution 20A-20N, the result is relayed back to the respective point of sale device 12 through the public network 14. In accordance with one transmission protocol, the response transmission is identified such that the point of sale device 12 is able to determine to which authorization request the response message relates. However, such a transaction identification is not required when a single authorization request is sent over a synchronous connection, such as a single credit card transaction. In this case, the point of sale device 12 can wait for a return value to an httpost, or wait on a dedication socket, as there are no other transactions which must be followed. However, if multiple transaction authorization requests are sent, either at the point of sale device or through a retail server system, or if multiple transactions are bundled into a single message, or for some other reason a synchronous responses are supported, such a transaction identification can be used.

As illustrated below in greater detail, processor system 44 can have other inputs, outputs or configurations. The network interface 46 and physical layer 48 can be in accordance with any appropriate standard or protocol.

Figure 4:
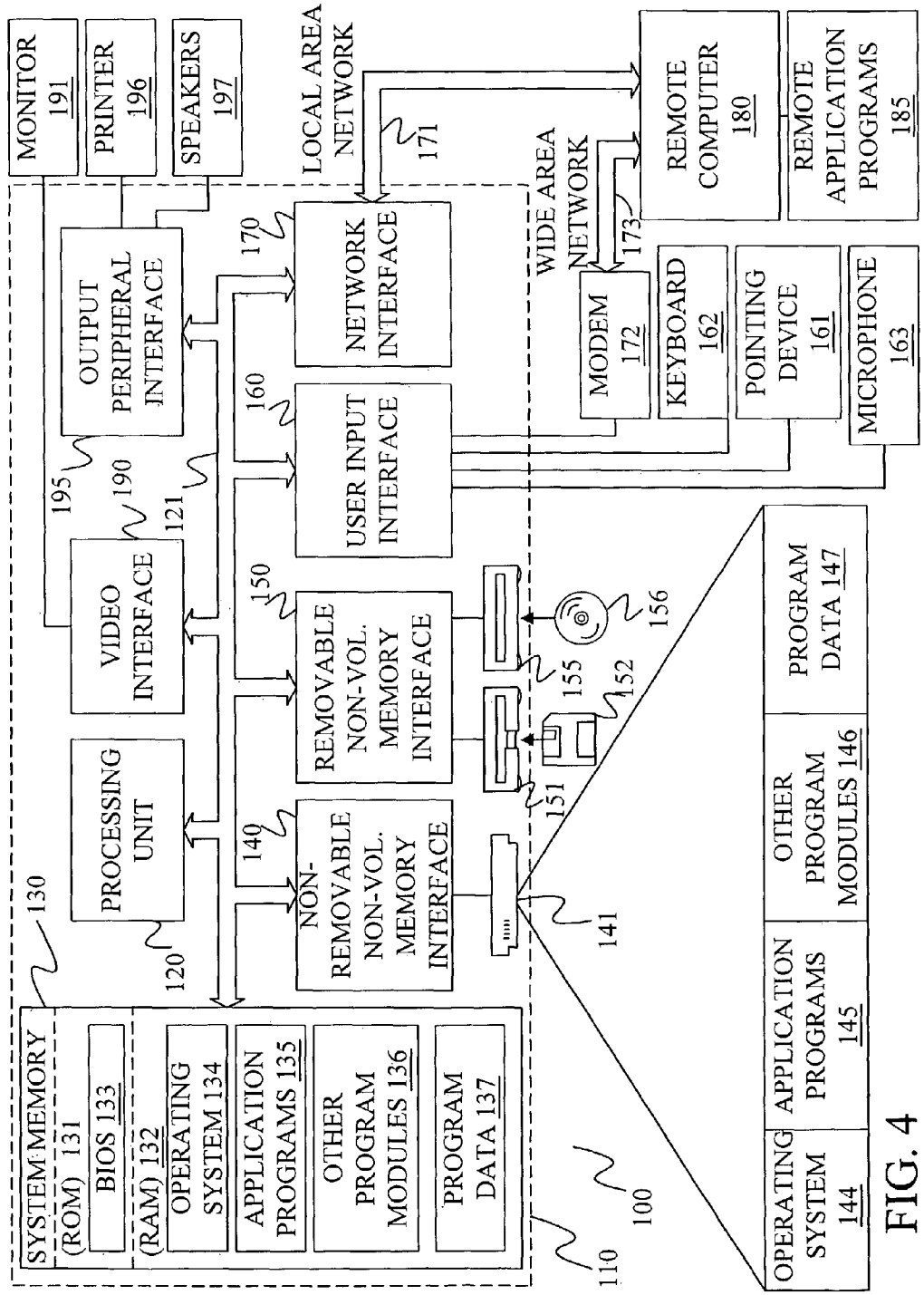
FIG. 4 is a block diagram of a general computing environment in which embodiments of the present invention may be practiced.

FIG. 4 illustrates an example of a suitable computing system environment 100 on which the invention may be implemented. System environment 100 can implement point of sale device 12 and/or payment processing gateway 16. The devices, for example payment processing gateway 16, can be implemented across multiple environments 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention can be implemented in numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, telephony systems, dedicated custom hardware, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. In some embodiments, the invention is designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing the invention includes a one or more general-purpose computing devices in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to a system bus, but may be connected by other interface and bus structures, such as a parallel port, game port or a universal serial bus (USB). The system bus may be implemented using any appropriate techniques. A monitor 191 or other type of display device is also connected to the system bus 121 via an interface, such as a video interface 190. In addition to the monitor, computers may also include other peripheral output devices such as speakers 197, printer 196, pole displays, modems, network interface cards, etc. which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. The WAN networking environment is provided by the public network 14 or private networks 18A-N. The computer 110 typically includes a modem 172 network interface card, or other means for establishing communications over the WAN 173, such as the Internet. A network connection to the WAN may also be through a gateway, router, proxy, or other connection to the WAN over the LAN. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

In one aspect, the present invention provides a new protocol for transmission of authorization requests and/or authorization responses between point of sale device 12 and payment processing gateway 16 over public network 14. The protocol can be configured for optimized implementation with retail management software which operates on a retail server system running on the gateway 16. In some embodiments, data can be preconfigured or otherwise previously stored in a database in memory 47 on the payment processing gateway 16 such that the data does not need to be retransmitted over the public network 14. This provides increased security while reducing transmission overhead.

Figures 5, 6:
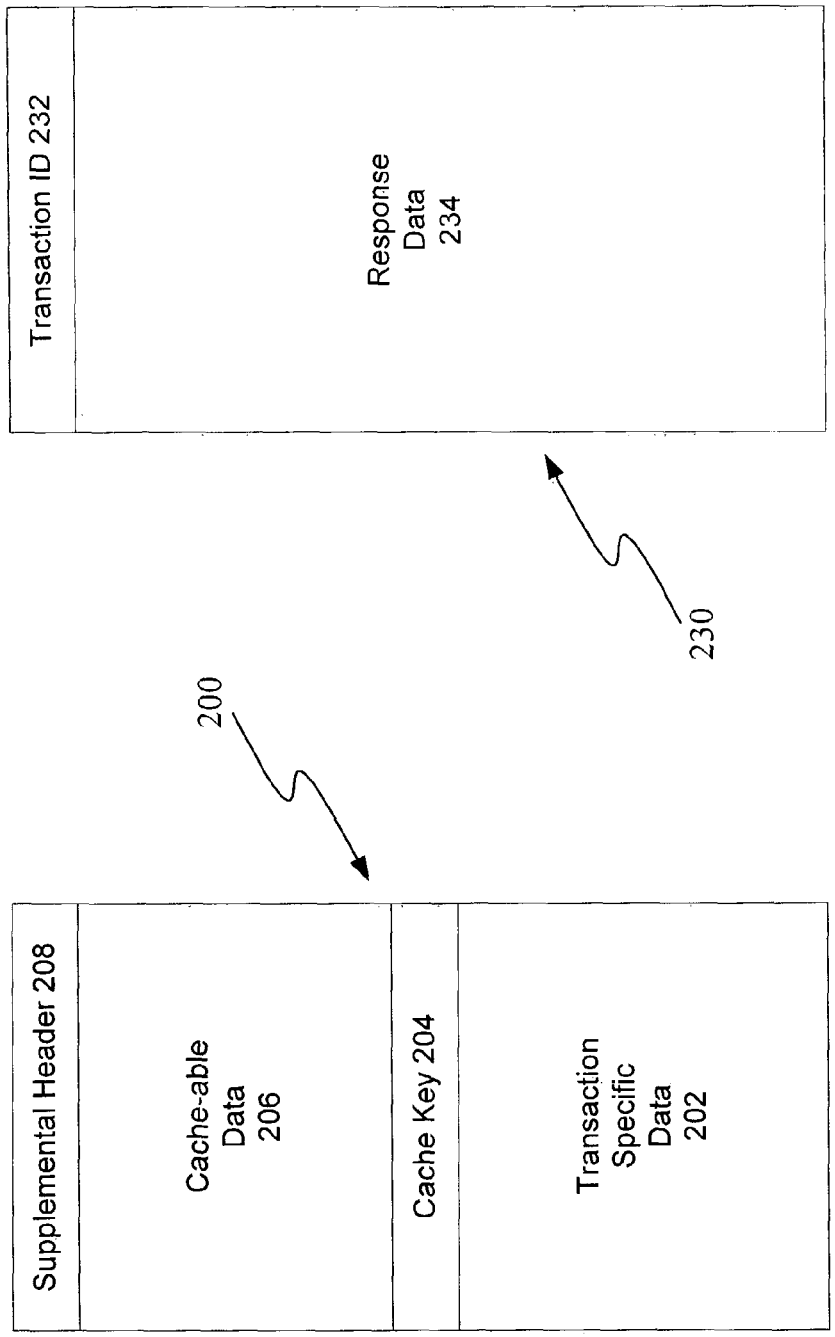
FIG. 5 is a block diagram showing an authorization request data packet.
FIG. 6 is a block diagram showing an authorization response data packet.

In one aspect, a supplemental header is pre-pended to the authorization request "payload". FIG. 5 is a block diagram showing an example authorization request 200. Authorization request 200 includes a transaction specific data field 202, cache-key field 204 and a cacheable data field 206. The supplemental header field 208 is shown pre-pended to the authorization request 200 on top of the cacheable data 206. The supplemental header carries a small amount of data which is used as a key to index a database in payment processing gateway 16. One example of such a field is one which identifies the financial contract(s) and terms of operation for particular acquiring banks or financial networks and the payment gateway provider. Such a "contract ID" field can be used by the payment processing gateway 16 to access a small list of valid contract IDs. This accessing can be through a simple in-memory list or an in-memory hash table to improve performance. If a particular transaction request arrives at the payment processing gateway 16 with an invalid contract ID, the payment processing gateway 16 can reject the authorization request because a valid contract is not properly identified for the particular merchant who sent the authorization request 200. In another example, the contract ID can be used to reference a particular subset of a group of valid financial networks, for example, an issuing financial institution frequently used more than one financial network and an acquiring bank or financial institution will indicate which subset of the various networks can be used by the merchant.

The rejection from the payment processing gateway 16 can be in the form of an authorization or transaction response transmission 230 shown in FIG. 6. A transaction response can include a transaction identification header field 232 and a response data field 234. The transaction identification field 232 identifies a particular transaction to which the response 230 is applicable. For example, a merchant may issue multiple transaction authorization requests 200 within a short period of time and the transaction identification field 232 is used to match a particular response with the appropriate request. As discussed above, the transaction ID is not required in all embodiments. The response field 234 includes data which indicates the response to the authorization request 200 such as "authorized", "declined", "hold card", "cut card", "bad card", "call issuer for further information", or request additional information from the purchaser, for example, to verify the authenticity of the card holder. As discussed below, the gateway 16 can also request transmission of cacheable data to populate a cache. If the contract ID for the supplemental header 208 is invalid, the payment processing gateway 16 can provide a response 234 to the authorization request 200 which indicates that the contract is invalid.

The contract ID field can also be used to audit transactions by payment processing gateway 16. This auditing can be used to ensure that merchants utilizing the payment processing gateway 16, or the financial institutions utilizing payment processing gateway 16, are properly charged for the use of the service. Further, the contact ID field can be used to analyze transactions to determine the source of the transactions, destination of the transaction, particular merchants involved, particular terms of the contract, etc. In one specific example, the contract identification comprises two bytes of 8 bits each.

In another example, the supplemental header 208 includes a payment type field. The payment type field is used to provide information to the payment processing gateway 16 as to which particular financial network 18A-N should be used for authorizing the transaction. For example, a particular financial network 18A-N may be for credit transactions of a particular type of debit card, while another financial network 18A-N may be for use with credit cards. Other financial networks may be directed to advance payment types such as gift cards, coupons, smart credit cards, "microcredits", etc.

"Microcredits" are directed to a credit format in which small dollar amount transactions may be performed through credit in a cost effective manner. The payment type field can also indicate the particular protocol used by the back-end financial network 18A-N and often within payload of the transmission, i.e., the transaction specific data 202.

The transaction authorization protocol 200 illustrated in FIG. 5 also provides a cache-key field 204. The cache-key 204 can be used to uniquely identify a particular shop or store submitting an authorization request. Merchant data can also be cached, for example for merchants with multiple stores. The payment processing gateway 16 can retrieve cache data within memory 34 illustrated in FIG. 2 based upon the cache-key. The cache data can be merchant or store invariant data information described below in more detail. In one specific embodiment, the cache-key field 204 comprises a 128 bit data field. The data field can be used to carry a GUID (Globally Unique Identifier). In another specific example, 12 bytes of the 128 bits identifies a particular merchant while the remaining 4 bytes identifies a particular store of that merchant.

The authorization request 200 may also contain cache-able data 206. Typical prior art financial transaction protocols are capable of carrying a fairly rich set of merchant data, including for example, merchant name (25 bytes), country (3 bytes), state (2 bytes), location (13 bytes), city code/zip code (3 bytes), merchant category (4 bytes), acquirer bin (6 bytes), time zone differential (3 bytes), merchant category code (4 bytes), extra field separators for ease of viewing (4 bytes) and others. The total can be more than 66 bytes of data for the main authorization message in a T-format authorization request message (direct debit). Typically, all of this data must be transmitted with each authorization request.

With the present invention, the transaction invariant data can be cached in memory 34 of payment gateway 16. In typical prior art gateways, such a cache would provide limited benefits due to server performance limitations and the difficulty of maintaining state across multiple servers arranged in a cluster. For example, the state of a particular transaction would be required to be maintained across a cluster of servers in a performat manner because there is a relatively high volume of authorization request which must be processed in near real time. Further, it is difficult to ensure that cached data is maintained or otherwise restored when a server is reset.

Web servers, for example, tend to be inherently stateless. With the present invention, payment processing gateway 16 is configured as a web server offering a web service which maintains state using a cache as desired in order to support such caching operations. The cache can be through any appropriate caching technique such as a shared file, a database, etc. Preferably, a caching mechanism is utilized which provides high performance and operates very efficiently to support large numbers of simultaneous transactions. In one aspect, the merchant invariant data is cached in volatile memory (i.e., RAM) of the payment processing gateway 16. For example, by caching 100 bytes of data per merchant and with 200,000 merchants, 20 megabytes of memory world be utilized.

Although this caching operation is particularly useful for authorization requests, the caching can also be utilized with settlement requests. A settlement request typically occurs less frequently than an authorization request. In a settlement request, a number of transactions are typically "batched" together for settlement with the appropriate financial institution. The settlement process involves the transfer of funds from the appropriate financial institution to the account of the merchant.

If the payment processing gateway 16 is implemented in a number of different servers, such as that provided by a web cluster, the caching of merchant or transaction invariant data can be achieved in any appropriate way. Even a small cluster of 2 servers can process a relatively large volume of authorization request traffic. For such a cache to be effective, the state can be maintained for each transaction being serviced by the gateway 16. A state service can be maintained across multiple web servers in a web cluster. Such a state service can be implemented in a shared server whereby each of the servers in the web cluster can access for the state information. Cache consistency and replication across multiple servers must be maintained for such an implementation. One specific implementation of such a state service is through the .NET framework provided by Microsoft Corporation, of Redmond, Wash. This framework supports a distributed computing environment in which applications may be written in any number of high level languages. The high level languages are compiled to a common runtime language known as CLR (Common Language Runtime). Further, in such an embodiment, the CLR can operate across various hardware platforms such that the implementation is hardware independent. In such an embodiment, the payment processing gateway 16 consists of a number of distributed computing systems. Objects can be used to exchange data between the systems and maintain.

In one implementation suitable for a small number of servers, each server maintains its own cache. A single server with sufficient processing capabilities may be capable of processing a substantial number of authorization requests.

The state service can operate with a database server, such as an SQL server which can be used to provide backup of stored data. The database can be used to restore the in-memory cache upon system failure of other fault.

In some embodiments, a single database access is employed for each authorization per transaction. For example, a procedure stored in the payment processing gateway 16 can be used to log the transaction to memory, for auditing, reporting, billing or other purposes. The same procedure used to log the data to the database can be used to read the associated cached invariant merchant data back from the database.

A web server front end can also be utilized with payment processing gateway 16 which directs web requests from a particular IP (Internet Protocol) address to the same server within the cluster. This particular redirection can be set for any time period, for example a number of days. Such a front end can be implemented in software or hardware components. With such an implementation, it is not necessary to synchronize the web server cache within the cluster. Instead, each web server within the cluster provided by the payment processing gateway 16 need only maintain state for the particular transactions which it is handling.

For small scale applications, a web service can be utilized such as that provided by ASP.NET. A particular ASP.NET page can be provided on each web server within the web cluster and used to update the cache of a given server.

A custom server can be provided which provides a state server to other computers within the cluster. The server can maintain an in-memory cache of merchant or store invariant records. The state server can respond to requests from the web cluster. If the state server is reset or otherwise looses data, the web cluster can provide a negative acknowledgement (i.e., NACK) to the merchant/store POS 12 thereby requesting that a complete data transmission be provided with the next transmission. The transmission of the complete data set can be provided for a desired length of time. This will cause the merchant to provide all of the merchant invariant data such that the database provided by the gateway 16 can be repopulated. During this period, the payment processing gateway 16 can provide the appropriate financial institution 20A-N with all the data received from a particular merchant, mapping various fields as required.

In embodiments such as those discussed above in which various data is cached within a memory in payment processing gateway 16, software operating at the point of sale device 12 can be configured to periodically transmit the entire data set for a given merchant to the payment processing gateway. This can be used to allow webservers or state servers of gateway 16 to be individually reset without difficulty. For example, the software running on a point of sale device 12 can be configured to submit a full data set every 2, 8 or 24 hours. Data transmissions such as the authorization response 230 shown in FIG. 6 can include an additional data field to allow the payment processing gateway 16 to indicate that the full merchant data is required. Alternatively, a separate message can be sent by the gateway 16. This data can be sent independently, or can be included in the next transaction request. Further, if only partial data is required, the message from the payment processing gateway 16 to the point of sale device 12 can indicate which data field or fields must be re-sent. In such a configuration, the payment processing gateway 16 can continue to accept partial data for a period of time after the initial request is sent. This allows multiple point of sale devices 12 within a store to transmit data to a payment processing gateway 16 which is implemented across multiple servers.

In order to further reduce the overhead of the messages exchanged across the public network 14, or local networks of the retail location, in one aspect the present invention eliminates redundant or unrequired transmissions. For example, some acknowledgement messages used in socket-based protocols such as the protocol implemented by VisaNet are redundant. This is especially true for protocols based upon HTTPS. In one specific example, the acknowledgement (ACK) which is transmitted before a response for a credit card transaction in a single transaction mode is not required. Although the acknowledgement can be useful in monitoring operation of the software during debugging, it is not normally required by the point of sale device 12. Other such non-essential transmissions can also be eliminated.

The various transmissions between the point of sale device 12 and the payment processing gateway 16, including the authorization request 200 and the authorization response 230, can be implemented using a number of techniques. For example, the HTTPS protocol can be used in which a packet or partial packet for transmission on a financial network 18A-N is "wrapped" as the payload in the secure transmission. This configuration is particularly useful when integrating point of sale devices 12 which are at retail locations or which are implemented online through a merchant website. Further, this configuration can scale to high transaction volumes as required.

In another example, the payment processing gateway 16 provides an XML service for communication with the point of sale device 12. This configuration is also well suited for integrating point of sale devices 12 which exist at both retail locations and from online merchants.

A secure socket layer (SSL) protocol can be used in which a particular message or packet is carried in an SSL wrapper. This implementation may be required for some debit card transactions and is suited for the high performance required to handle a large volume of transactions. Further, such a protocol can be used to keep a socket open on a financial network 18A-N during the entire transaction process. Server clustering techniques such as thread pooling, clustering and load balancing can be implemented to support such an SSL protocol.

In another implementation of the present invention, the payment processing gateway 16 can provide a back end server process to maintain open payment sockets (or equivalents) through the financial networks 18A-N. Such a back end service can be synchronized with a stateless front end coupled to public network 14. Although credit card authorizations can typically be handled as a single synchronous transaction, debit card transactions typically require an additional final acknowledgement from the point of sale device 12 to the payment processing gateway 16 and to the appropriate financial institution 20A-N over a financial network 18A-N. This additional acknowledgement confirms that the retailer received the authorization acknowledgement and that the funds transfer was settled. If this acknowledgement is not received, the transaction is automatically reversed and the funds are returned to the customer's account. This can be implemented using a socket based protocol, such as SSL, where a server thread is used to maintain both the front end and back end socket sessions. However, this is more difficult to implement in a web based protocol which utilizes web servers such as Microsoft's IIS. As discussed above, web services are inherently stateless. Therefore, without additional implementation, the final acknowledgement may go to a different thread than the original transaction, and possibly even to a different server in a web cluster. In one aspect, the present invention maintains a thread in the web service such that such an acknowledgement can be sent to the appropriate financial institution.

The back end server process typically on a separate common server can be used to maintain an open back end socket over the appropriate financial network 18A-N. In such an embodiment, the socket must be uniquely identified to the front end web server, for example using a GUID which the back end server maps to a specific socket port. The front end web server coupled to the public network 14 will place transaction messages on the appropriate queue. The queue is then accessed by the back end server process. The back end server process can be single or multi-threaded and processes messages by assigning them to a new or existing socket session as appropriate. A new socket session with a financial institute 18A-N is opened at the start of each transaction and closed at the end of the transaction. All messages for a given transaction will occur over the same socket. Socket connections for incomplete transactions can be set to time out after a predetermined interval to protect server resources.

Although in typical payment processing systems, the point of sale device is required to provide an acknowledgement to the gateway during a debit card transaction, in one aspect, the present invention operates without the need for such a second acknowledgement. For example, the gateway can send a second acknowledgement back through the financial network without waiting for the acknowledgement to be received from the point of sale device. This allows the transaction to be stateless within the gateway and the debit transaction can then be easily supported over the HTTPS protocol without the need to use sockets such as SSL, directly. This configuration allows standard web servers to implement the present invention. Without the second acknowledgement from the point of the sale device, an additional safety mechanism can be provided to prevent a duplicate transaction from being processed. For example, the gateway can detect that the same or a similar transaction is being run from the same terminal or store within a specific period of time. If such a transaction is identified by the gateway, the gateway can simply block the transaction or send some type of a message back to the point of sale device indicating that an error has occurred or warning that a duplicate transaction has been received, request a confirmation that the duplicate data should be processed, request that the data be specifically called in, or simply acknowledge a successfully processed transaction previously. For example, if the same payment instrument is used from the same point of sale terminal within a relatively small time window, for example, one to two minutes, a simple acknowledgement can be provided.

Although the present invention has been described with reference to particular embodiments, workers skilled in the art will recognize that changes may be made in form and detail without departing from the spirit and scope of the invention. In one aspect, the present invention is configured to operate as a web service. In another aspect, a socket server implementation is used. In general, web services provide transactional functions which operate across a network such as the Internet. Web services adhere to a shared specification such that they are able to share objects and exchange data. One extension of web services which is well suited for implementation of the present invention is the web services enhancements (WSE) class library available in the Microsoft- .NET framework. The present invention is applicable to electronic fund transfers based upon financial transaction authorization requests, and response to such requests. Although cards are specifically discussed, the invention relates to any type of payment instrument that can be used. The financial transaction authorization request are conveyed from a source, such as a store or merchant, to an authorization provider, such as a financial institution, over public and/or private networks or direct connections.

What is claimed is:

1. A payment processing gateway server for processing financial transactions, comprising:

a public network interface coupled to a public network such that the payment processing gateway server receives a first financial transaction authorization request, the first financial transaction authorization request being received from a merchant by way of the public network and the public network interface, wherein the first financial transaction authorization request includes transaction specific data, and a supplemental header, wherein the supplemental header includes a contract identification field in which there is stored an identification of a contract between the merchant and a payment provider;

a gateway memory that includes a listing of valid contract identifications and a cache of merchant invariant data, wherein the first financial transaction authorization request also includes a cache-key that identifies a sub-set of all data in the cache, and wherein the first financial authorization request also includes a cacheable data field containing data that is added to said cache of merchant invariant data;

a gateway processor that processes the first financial transaction authorization request by comparing said contract identified in the contract identification field to the listing of valid contract identifications, and wherein the gateway processor is configured to reject the first financial transaction authorization request based upon a determination that the contract identified in the contract identification field does not match any valid contract identification in the listing of valid contract identifications;

a financial network interface coupled to a financial network such that the payment processing gateway server transmits, over the financial network interface and over the financial network, a second financial transaction authorization request to a financial institution coupled to the financial network, the second financial transaction authorization request being generated by the gateway processor so as to correspond to and be indicative of information contained in the first financial transaction authorization request, and wherein the payment processing gateway server receives from the financial institution, by way of the financial network interface and the financial network, a response to the second financial transaction authorization request in the form of a first financial transaction authorization result;

wherein the gateway processor sends a second financial transaction authorization result to the merchant as a response to the first financial transaction authorization request received from the merchant, the second financial transaction authorization result corresponding to and being indicative of information contained in the first financial transaction authorization result; and wherein the payment processing gateway server is implemented across a plurality of servers, a portion of the plurality of servers being web servers organized in a web cluster, at least one of the plurality of servers being a shared server, and wherein the web servers access state information from the shared server, the shared server maintaining consistency of the cache of merchant invariant data and monitoring replication across the web servers.

2. The apparatus of claim 1 wherein configured to reject comprises the gateway processor configured to send a transaction response to the merchant by way of the public network interface and the public network, and wherein the transaction response includes a transaction header field and a response data field, wherein the transaction header field identifies a particular transaction.

3. The apparatus of claim 1 wherein when the gateway processor rejects the first financial transaction authorization request based upon said determination that the contract identified in the contract identification field does not match any valid contract identification in the listing of valid contract identifications, it does so by sending negative acknowledgement message to the merchant by way of the public network interface and the public network.

4. The apparatus of claim 1 wherein the gateway processor sends an acknowledge message to the merchant by way of the public network interface and the public network upon a determination that the contract identified in the contract identification field does match a valid contract identification in the listing of valid contract identifications.

5. The apparatus of claim 2 wherein the contract identification field comprises two bytes of 8 data bits each.

6. The apparatus of claim 5 wherein the gateway memory includes a record of log data indicative of data carried in the contract identification field of the first financial transaction authorization request, wherein the gateway memory also includes in the record of log data an indication of data carried in a contract identification.

7. The apparatus of claim 6 wherein the gateway processor maintains an open socket connection with the financial institution through the financial network interface.

8. The apparatus of claim 6 wherein the supplemental header includes a payment type field.

9. The apparatus of claim 8 wherein the payment processing gateway server receives the first financial transaction authorization request from the merchant based on communication made in accordance with an HTTPS standard.

10. The apparatus of claim 8 wherein the payment processing gateway server receives the first financial transaction authorization request from the merchant based on communication made in accordance with an XML standard.

11. The apparatus of claim 8 wherein the payment processing gateway server receives the first financial transaction authorization request from the merchant based on communication made through a secure socket layer.

12. The apparatus of claim 6 wherein the gateway processor sends an acknowledge message to the merchant by way of the public network interface and the public network upon a determination that the contract identified in the contract identification field does match a valid contract identification in the listing of valid contract identifications, the acknowledgement message being sent to the merchant before the second financial transaction authorization result is sent to the merchant.

13. A payment processing gateway server for processing financial transactions, comprising:

a public network interface coupled to a public network such that the payment processing gateway server receives a first financial transaction authorization requests, the first financial transaction authorization request being received from a first merchants by way of the public network and the public network interface, wherein the first financial transaction authorization request includes transaction specific data, a supplemental header, and a cache-key field;

a gateway memory that includes a cache of merchant invariant data, wherein the merchant invariant data includes, for a plurality of different merchants, a merchant name, and a merchant location;

a gateway processor that selects a sub-set of the merchant invariant data, the sub-set being for the first merchant and the selection of the sub-set being-based upon data stored in the cache-key field;

a financial network interface coupled to a financial network such that the payment processing gateway server and transmits, over the financial network interface and over the financial network, a second financial transaction authorization requests to a financial institution coupled to the financial network, the second financial transaction authorization request being generated by the gateway processor so as to correspond to and be indicative of information contained in the first financial transaction authorization request, and wherein the payment processing gateway receives from the financial institution, by way of the financial network interface and the financial network, a response to the second financial transaction authorization_ request in the form of a first financial transaction authorization results;

wherein the gateway processor sends a second financial transaction authorization results to the merchants as a response to the first financial transaction authorization request received from the merchant, the second financial transaction authorization result corresponding to and being indicative of information contained in the first financial transaction authorization result;

wherein the supplemental header includes a payment type identification field that includes data that identifies the financial network coupled to the financial network interface.

14. The apparatus of claim 13 wherein the payment type identification field identifies a transaction type and a protocol format of the transaction specific data.

15. The apparatus of claim 14 further comprising:

a back end server process that maintains an open payment socket to the at least one financial network.

16. The apparatus of claim 15 wherein the supplemental header further includes a contract identification field which identifies a contract with a payment provider.

17. The apparatus of claim 16 wherein the financial transaction authorization requests includes a cacheable data field and wherein the gateway processor at least partially populates the cache of merchant invariant data with data received in the cacheable data field.

18. The apparatus of claim 17 wherein the payment processing gateway server is implemented across a plurality of web servers, and wherein the apparatus further comprises a web server front end process that utilizes the gateway processor to enforce a rule that requires web requests from one particular Internet Protocol address to one particular web server in said plurality.

19. The apparatus of claim 18 wherein the open payment socket is a secure socket layer connection.

20. The apparatus of claim 18 wherein the first financial transaction authorization requests is formatted in accordance with an HTTPS standard.

21. The apparatus of claim 18 wherein the first financial transaction authorization requests is formatted in accordance with an XML standard.

22. The apparatus of claim 18 wherein the first financial transaction authorization requests is transmitted through a secure socket layer.

23. The apparatus of claim 18 wherein an acknowledgment message is transmitted through the public network interface by the gateway server to the merchant, said transmission of the acknowledgment message corresponding to but not preceding said sending by the gateway processor of the second financial transaction authorization result to the merchant.

24. A payment processing gateway server for processing financial transactions, comprising:
- a public network interface coupled to a public network such that the payment processing gateway receives a first financial transaction authorization requests, the first financial transaction authorization requests being received from a merchants by way of the public network and the public network interface, wherein the first financial transaction authorization request includes transaction specific data, cache-able data and a cache key, wherein the cache key comprises data indicative of the merchant;
- a gateway memory that caches the cache-able data in a location within the gateway memory as designated by the cache key;
- a gateway processor that references the cache key as part of a retrieval of retrieve the cache-able data from the gateway memory;
- a financial network interface coupled to a plurality of financial networks such that the payment processing gateway server transmits, over the financial network interface and over the financial network, a second financial transaction authorization requests to a particular one of the plurality of financial institutions as designated directly or indirectly in the first financial transaction authorization request, wherein the second financial transaction authorization request is generated by the gateway processor so as to correspond to and be indicative of information contained in the first financial transaction authorization request, and wherein the payment processing gateway receives from the particular financial institution, by way of the financial network interface and the financial network, a response to the second financial transaction authorization request in the form of a first financial transaction authorization result; and
- wherein the gateway processor sends a second financial transaction authorization result to the merchant as a response to the first financial transaction authorization request received from the merchant, the second financial transaction authorization result also being indicative of information contained in the first financial transaction authorization result.

25. The apparatus of claim 24 wherein sending the second financial transaction authorization result comprises sending a partial or complete copy of the first financial transaction authorization result.

26. The apparatus of claim 24 wherein the cache key comprises a GUID (Globally Unique Identifier).

27. The apparatus of claim 26 wherein the cache-able data includes data selected from the group of data consisting of merchant, country, merchant state, merchant category and time zone information.

28. The apparatus of claim 27 wherein the gateway processor sends the second financial transaction authorization result to the merchant by way of a web service provided to the merchant by the payment processing gateway server.

29. The apparatus of claim 28 wherein the web service maintains state in relation to for the first financial transaction authorization request.

30. The apparatus of claim 27 wherein the gateway processor sends the second financial transaction authorization result to the merchant by executing commands involving functionality carried out within a common language run time environment.

31. The apparatus of claim 27 wherein transmitting the second financial transaction authorization request comprises sending a partial or complete copy of the first financial transaction authorization request.

32. The apparatus of claim 30 wherein the said executing commands comprises commands executed by a common language runtime engine.

33. The apparatus of claim 24 wherein the gateway processor is one of a plurality of gateway processors that are part of the payment processing gateway server, the plurality of gateway processors being configured so as to form a web cluster.

34. The apparatus of claim 33 further comprising a director that directs the first financial transaction authorization request from the merchant to a specific one of the plurality of gateway processors, the specific one being the one that generates the second financial transaction authorization request.

35. The apparatus of claim 24 wherein the gateway processor transmits a transmission request message to the merchants through the public network interface, the transmission request requesting a transmission of the cache-able data.

36. The apparatus of claim 27 wherein the first financial transaction authorization request includes a supplemental header that includes a contract identification field containing data that indicates a contract with the particular one of the plurality of financial institutions.

37. The apparatus of claim 36 wherein the supplemental header also includes a payment type identification field.

38. The apparatus of claim 37 wherein the first financial transaction authorization requests is formatted in accordance with an HTTPS standard.

39. The apparatus of claim 37 wherein the first financial transaction authorization requests is formatted in accordance with an XML standard.

40. The apparatus of claim 37 wherein the first authorization requests is transmitted through a secure socket layer.

41. The apparatus of claim 37 wherein the gateway processor processes the first financial transaction authorization requests using a stateless logic implementation, and wherein the gateway processor synchronizes socket sessions with the plurality of financial institutions through the financial network interface.

42. A payment processing gateway server for processing financial transactions, comprising:

- a public network interface coupled to a public network such that the payment processing gateway server receives a first financial transaction authorization requests, the first financial transaction authorization requests being received from a merchants by way of the public network and the public network interface, wherein the first financial transaction authorization request includes transaction specific data and merchant data directly or indirectly indicating the merchant;
- a gateway processor that processes the first financial transaction authorization requests such that the processing of the first financial transaction authorization requests is stateless, and the gateway processor implements a socket based protocol, the gateway processor utilizing a server thread to maintain a socket sessions with the merchant and with a financial institution;
- a financial network interface coupled to a financial network such that the payment processing gateway server transmits a second financial transaction authorization requests to the financial institution which is coupled to financial network, the second financial authorization request being generated by the gateway processor so as to correspond to or be a copy of information contained in the first financial transaction authorization request, and wherein the payment processing gateway receives from the financial institution, by way of the financial network interface and the financial network, a response to the second financial transaction authorization request in the form of a first financial transaction authorization results;
- wherein the gateway processor sends a second financial transaction authorization result to the merchant as a response to the first financial transaction authorization request received from the merchant, the second financial transaction authorization result corresponding to or being a copy of information contained in the first financial transaction authorization result;
- wherein the gateway processor to sends an acknowledgement to the financial institution the acknowledgment being separate and distinct from the second financial transaction authorization request.

43. The apparatus of claim 42 wherein the gateway processor recognizes that the first financial transaction authorization request is a duplicate financial transaction authorization request sent from the merchant within a predetermined time limit, and wherein the gateway processor transmits a duplicate notification message to the merchant in response to the recognition of the duplicate financial transaction authorization request.

* * * * *